United States Patent
Doerr

(10) Patent No.: US 8,682,120 B2
(45) Date of Patent: Mar. 25, 2014

(54) POLARIZATION-INDEPENDENT GRATING OPTICAL COUPLER

(75) Inventor: Christopher R. Doerr, Middletown, NJ (US)

(73) Assignee: Alcatel Lucent, Paris (FR)

( * ) Notice: Subject to any disclaimer, the term of this patent is extended or adjusted under 35 U.S.C. 154(b) by 349 days.

(21) Appl. No.: 13/041,364

(22) Filed: Mar. 5, 2011

(65) Prior Publication Data
US 2012/0224810 A1   Sep. 6, 2012

(51) Int. Cl.
*G02B 6/34*       (2006.01)
*G02B 5/18*       (2006.01)

(52) U.S. Cl.
USPC ............................. 385/37; 359/566; 359/569

(58) Field of Classification Search
USPC .......................................................... 385/37
See application file for complete search history.

(56) References Cited

U.S. PATENT DOCUMENTS

| | | | |
|---|---|---|---|
| 5,127,733 A | 7/1992 | Allgauer | |
| 5,357,591 A | 10/1994 | Jiang et al. | |
| 5,495,543 A * | 2/1996 | Alferness et al. | 385/37 |
| 5,621,715 A | 4/1997 | Ohyama | |
| 5,933,120 A | 8/1999 | Manasson et al. | |
| 6,534,429 B1 | 3/2003 | Jackson | |
| 6,535,678 B1 | 3/2003 | Yamauchi et al. | |
| 6,594,429 B1 | 7/2003 | White | |
| 6,711,334 B2 | 3/2004 | Szkopek et al. | |
| 6,782,148 B2 | 8/2004 | Eggleton et al. | |
| 6,956,987 B2 | 10/2005 | Doerr | |
| 7,184,627 B1 | 2/2007 | Gunn, III et al. | |
| 7,317,857 B2 | 1/2008 | Manyam et al. | |
| 7,376,309 B2 | 5/2008 | Gulde | |
| 7,424,195 B2 | 9/2008 | Andrieu et al. | |
| 7,474,825 B1 | 1/2009 | Horst et al. | |
| RE41,570 E | 8/2010 | Greiner et al. | |
| RE42,540 E | 7/2011 | Iazikov et al. | |
| RE43,226 E | 3/2012 | Iazikov et al. | |

(Continued)

FOREIGN PATENT DOCUMENTS

| | | | |
|---|---|---|---|
| EP | 419257 A3 | 9/1990 |
| EP | 709938 A3 | 10/1997 |

(Continued)

OTHER PUBLICATIONS

Chen, Xia et al., "Polarization-Independent Grating Couplers for Silicon-on-Insulator Nanophotonic Waveguides", Optics Letters, Feb. 8, 2011, 4 pages.

(Continued)

*Primary Examiner* — Hemang Sanghavi
(74) *Attorney, Agent, or Firm* — Hitt Gaines, PC

(57) ABSTRACT

An optical device comprising a planar waveguide located on a planar substrate, the planar waveguide including a light-transmissive layer and an optical grating coupler being located along the planar substrate and being adjacent to and optically coupled to the planar waveguide. The optical coupler includes an optical grating of the light-transmissive layer. The optical grating includes a periodic arrangement of light-refractive structures and one or more slotted openings separating the optical grating into two or more grating segments that have long axes that are substantially parallel to a propagation direction of a light beam configured to pass between the planar waveguide and the optical coupler. Pitch distances between adjacent ones of the grating segments are less than a wavelength of the light beam divided by an effective refractive index of the light-transmissive layer.

22 Claims, 9 Drawing Sheets

(56) References Cited

U.S. PATENT DOCUMENTS

| | | |
|---|---|---|
| 2003/0174985 A1 | 9/2003 | Egleton et al. |
| 2005/0100300 A1 | 5/2005 | Joyner et al. |
| 2005/0147355 A1 | 7/2005 | Ilchenko |
| 2006/0127024 A1 | 6/2006 | Smith et al. |
| 2006/0285795 A1 | 12/2006 | Fondeur |
| 2007/0201796 A1 | 8/2007 | Gulde |
| 2008/0069496 A1* | 3/2008 | Tolstikhin et al. ............... 385/30 |
| 2008/0142828 A1 | 6/2008 | Yang |
| 2010/0209045 A1 | 8/2010 | Okayama |
| 2010/0329608 A1* | 12/2010 | Ogawa et al. ................... 385/37 |
| 2010/0329670 A1 | 12/2010 | Essiambre |
| 2010/0329671 A1 | 12/2010 | Essiambre |
| 2011/0243574 A1 | 10/2011 | Essiambre et al. |
| 2012/0170933 A1 | 7/2012 | Doerr et al. |
| 2012/0183304 A1 | 7/2012 | Winzer et al. |
| 2012/0224805 A1 | 9/2012 | Doerr |
| 2012/0224810 A1 | 9/2012 | Doerr |
| 2012/0251126 A1 | 10/2012 | Winzer et al. |

FOREIGN PATENT DOCUMENTS

| | | |
|---|---|---|
| JP | 62187310 A | 8/1987 |
| JP | 63150981 A | 6/1988 |
| JP | 02191916 A | 7/1990 |
| JP | 3246510 A | 11/1991 |
| JP | 07335855 A | 12/1995 |
| JP | 11134696 A | 5/1999 |

OTHER PUBLICATIONS

Mekis, Attila, et al., "A Grating-Coupler-Enabled CMOS Photonics Platform", IEEE Journal of Selected Topics in Quantum Electronics, vol. 17, No. 3, Nov. 29,2010, 12 pages.
Gloge, D. et al., "Impulse Response of Fibers With Ring-Shaped Parabolic Index Distribution", Bell System Tech. J., vol. 52, No. 7, Sep. 1973, pp. 1161-1168.
Kogelnik, H., "Theory of Optical Waveguides", Guided-Wave Optoelectronics, Springer-Verlag, Berlin, 1990, pp. 12-17.
Lee, B. G. et al., "120-Gb/s 100-m Transmission in a Single Multicore Multimode Fiber Containing Six Cores Interfaced wit a Matching VCSEL Array", Photonics Society Summer Topical Meeting Series, Jul. 19-21, 2010 IEEE, TuD4.4. 16.30-16.45, pp. 223-224.
Doerr, Christopher Richard, U.S. Appl. No. 13/077,149, filed Mar. 31, 2011, "Optical Fibers With Tubular Optical Cores", 36 pages.
Winzer, Peter J., U.S. Appl. No. 13/076,917, filed Mar. 31, 2011, "Multi-Core Optical Fiber and Optical Communication Systems," 22 pages.
Doerr, Christopher R., U.S. Appl. No. 13/041,366, filed Mar. 5, 2011, "Radial Optical Coupler," 44 pages.
Ryf, R. et al., "Space-division multiplexing over 10 km of three-mode fiber using coherent 6×6 MIMO processing" Optical Fieber Communication Conference (OFC), Post deadline paper PDPB10, Mar. 8, 2011, ISA/OFC/NFOEC 2011, 3 pgs.
Doerr, Christopher R. et al., "Circular grating coupler for creating focused azimuthally and radially polarized beams", Optics Letters, vol. 36, No. 7, Apr. 1, 2011, pp. 1209-1211.
Dorn, R. et al., "Sharper Focus for a Radially Polarized Light Beam", Physical Review Letters, vol. 91, No. 23, Dec. 5, 2003, pp. 233901-1-233901-4.
Gupta, Devki Nandan, et al., "Electron Acceleration to GeV energy by a radially polarized laser", Physics Letters A, 368, 2007, pp. 402-407.
Ibanescu, M., et al., "An All-Dielectric Coaxial Waveguide", Science, vol. 289, 21 Jul. 2000, pp. 415-419.
Kogelnik, H., et al, "Laser Beams and Resonators", Proceedings of the IEEE, vol. 54, No. 10, Oct. 1966, pp. 1312-1329.
Passilly, Nicolas, et al, "Simple interferometric technique for generation of a radially polarized light beam", J. Opt. Soc. Am. A, vol. 22, No. 5, May 2005, pp. 984-991.
Mushiake, Y., et al, "Generation of Radially Polarized Optical Beam Mode by Laser Oscillation", Proceedings of the IEEE, 60, Sep. 1972, pp. 1107-1109.
Jordan, Rebecca H., et al, "Lasing behavior of circular grating surface-emitting semiconductor lasers", J. Opt. Soc. Am. B, vol. 14, No. 2, Feb. 1997, pp. 449-453.
Miyai, E., et al, "Lasers producing tailored beams", Nature, vol. 441, 22 Jun. 2006, p. 946.
Noda, Susumu, et al, "Polarization Mode Control of Two-Dimensional Photonic Crystal Laser by Unit Cell Structure Design", Science, vol. 293, Aug. 10, 2001, pp. 1123-1125.
Doerr, Christopher R., "360 Star Coupler for Detecting Subwavelength Features", IEEE Photonics Technology Letters, vol. 20, No. 17, Sep. 1, 2008, pp. 1440-1442.
Dragone, C., "Optimum design of a planar array of tapered waveguides", J. Opt. Soc. Am. A, vol. 7, No. 11, Nov. 1990, pp. 2081-2093.
Curtis, Jennifer E., et al, "Dynamic Holographic Optical Tweezers", Opt. Commun., 207, Apr. 17, 2002, p. 169 et seq.
Kitamura, Kyoko, et al, "Sub-wavelength focal spot with long depth of focus generated by radially polarized, narrow-width annular beam", Optics Express, vol. 18, No. 5, Mar. 1, 2010, pp. 4518-4525.
Zurita-Sanchez, Jorge R., et al, "Multipolar interband absorption in a semiconductor quantum dot. II. Magnetic dipole enhancement", J. Opt. Soc. Am. B, vol. 19, No. 11, Nov. 2002, pp. 2722-2726.
Loudon, R., The Quantum Theory of Light (Oxford University, 1973), Chapter 8, pp. 172-173.
Doerr, Christopher R., et al, U.S. Appl. No. 13/012,712, filed Jan. 24, 2011, "Core-Selective Optical Switches," 46 pages.
Essiambre, Rene-Jean, et al, U.S. Appl. No. 12/827,641, filed Jun. 30, 2010, "Multimode-Optical Communication", 46 pages.
Dragone, C., "Efficient N×N Star Coupler Based on Fourier Optics", Electronics Letters, vol. 24, No. 15, Jul. 1988, pp. 942-944.
Whitesides, George M., "The origins and the future of microfluidics", Nature, vol. 442, Jul. 27, 2006, pp. 368-373.
Zurita-Sanchez, Jorge R., et al, "Multipolar interband absorption in a semiconductor quantum dot. I. Electric quadrupole enhancement", J. Opt. Soc. Am. B, vol. 19, No. 6, Jun. 2002, pp. 1355-1362.
Chen, Xia et al.; "Polarization-Independent Grating Couplers for Silicon-on-Insulator Nanophotonic Waveguides" Optics Letters, Feb. 8, 2011, 4 pages.
Mekis, Attila, et al.; "A Grating-Coupler-Enabled CMOS Photonics Platform"; IEEE Journal 2010; 12 pages.
PCT International Search Report, PCT/US2012/025344, International Filing Date of Feb. 16, 2012, Date of Mailing of Search Report Jan. 21, 2013, 3 pgs.
Patent Abstracts of Japan, Publication No. 09-218318, published Aug. 19, 1997, 1 pg.

* cited by examiner

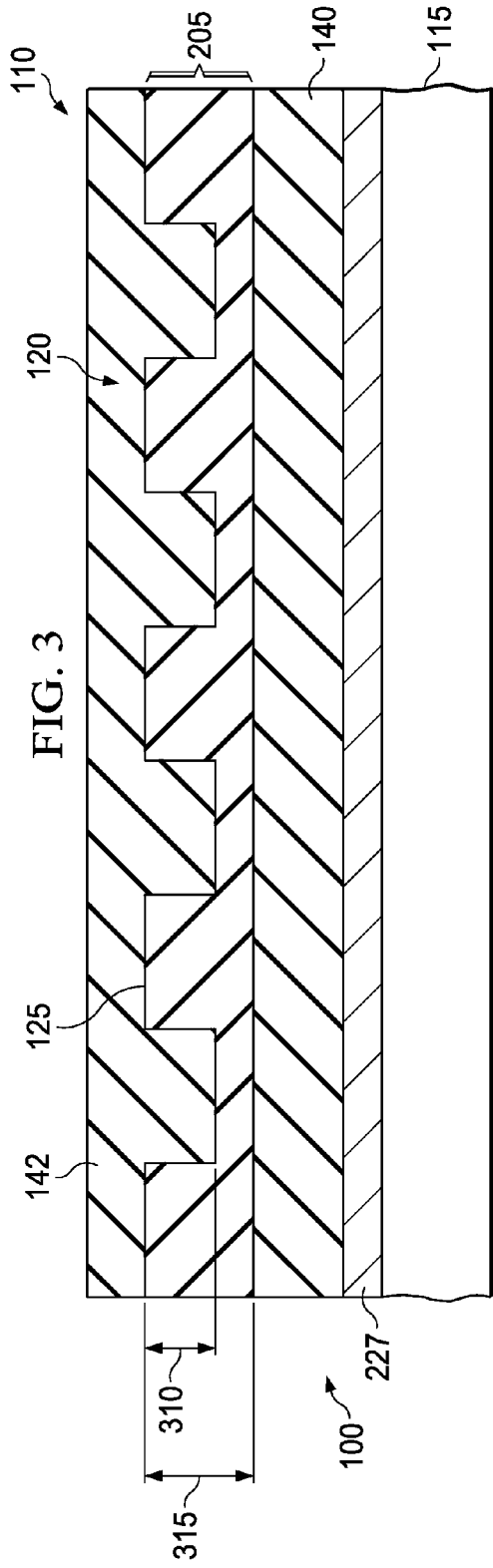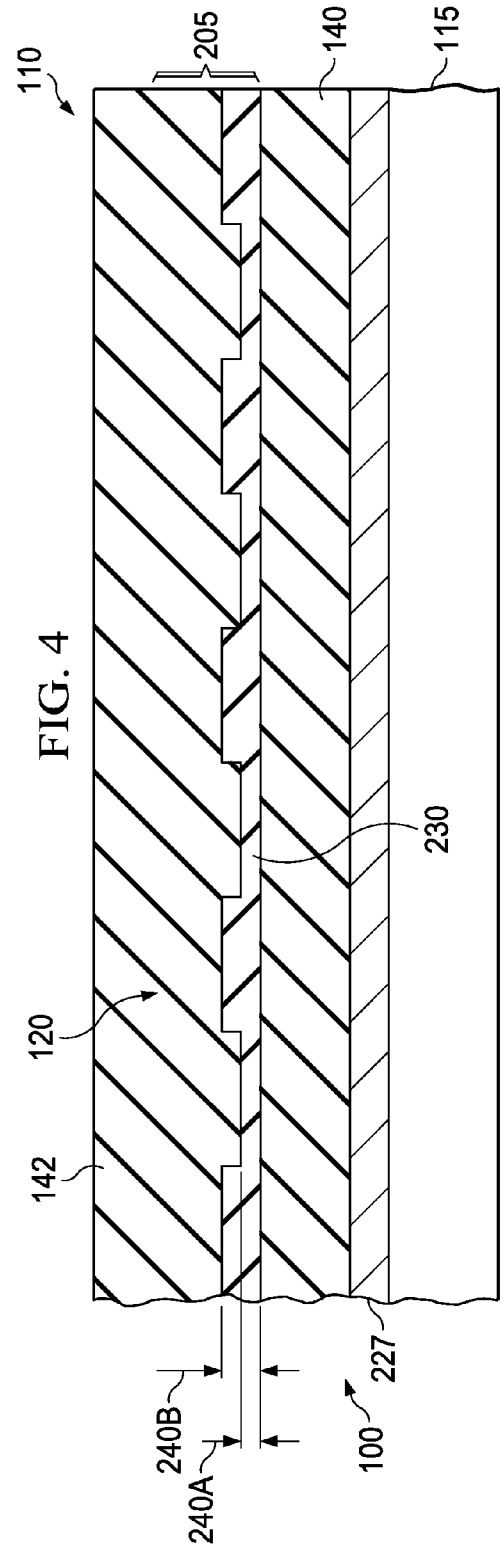

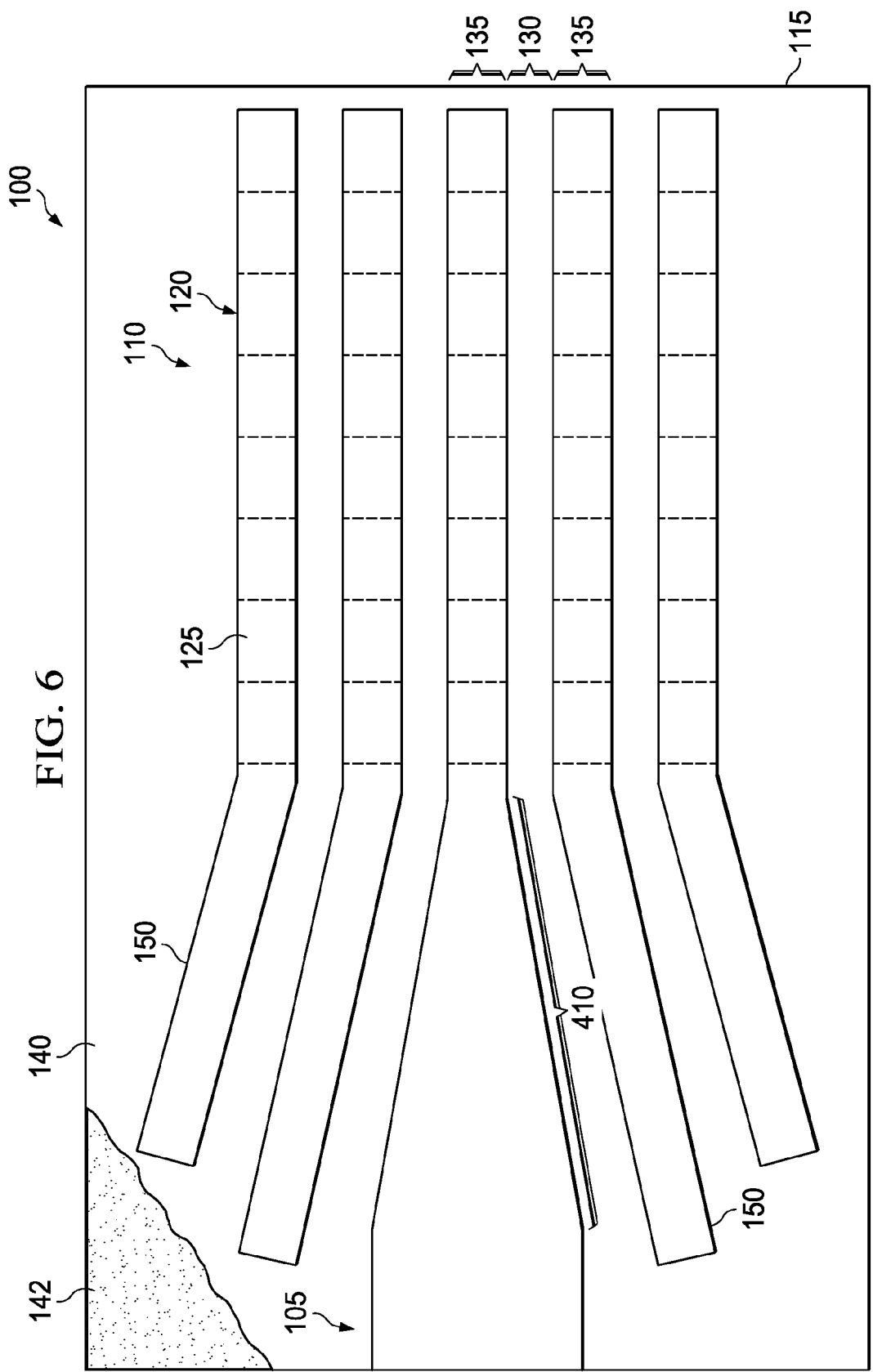

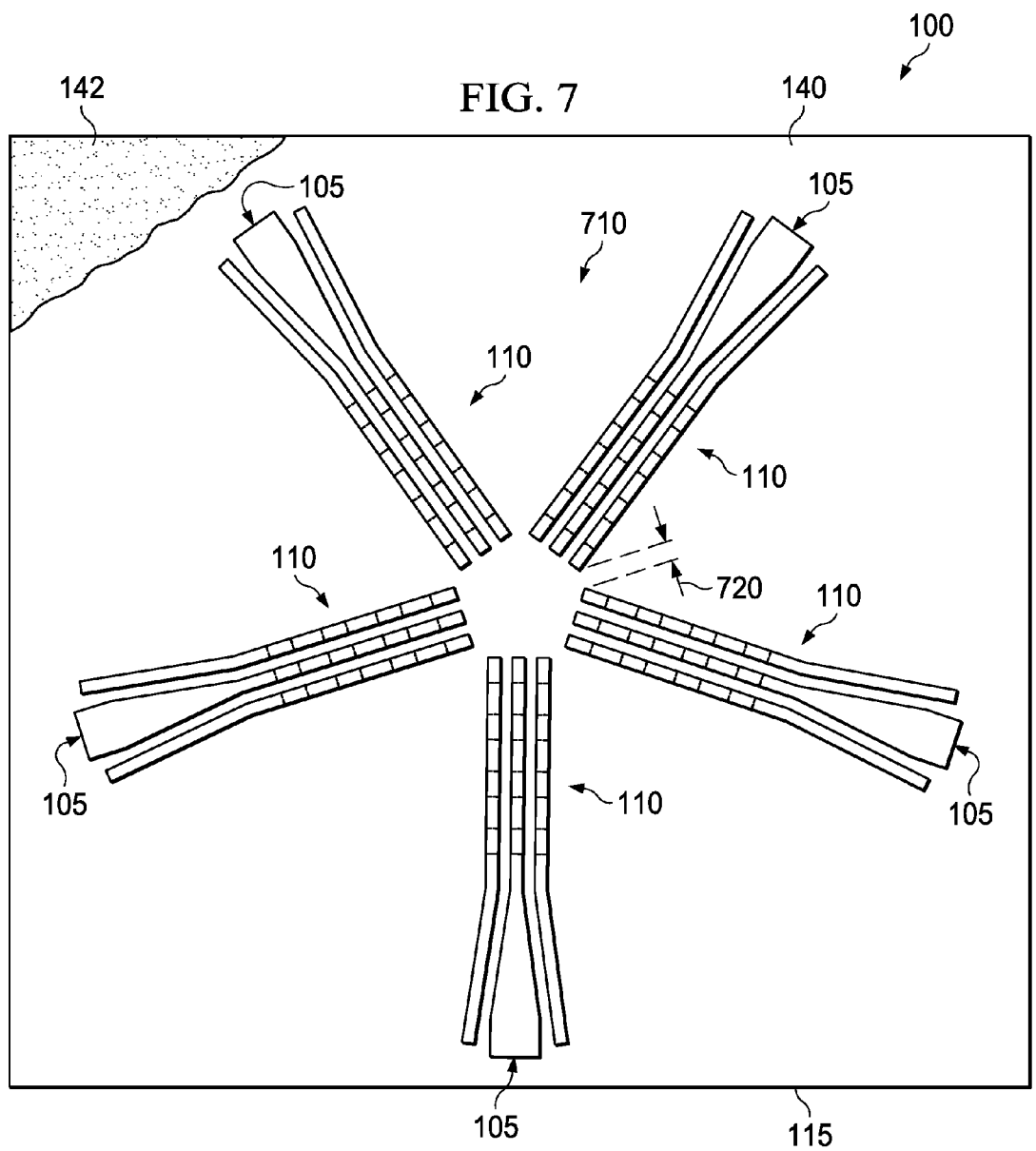

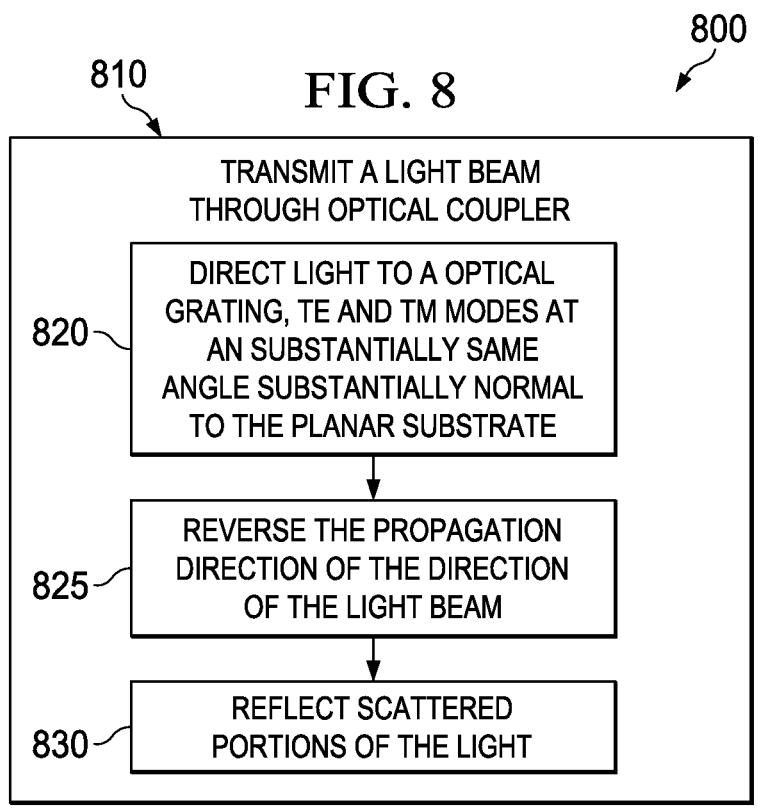

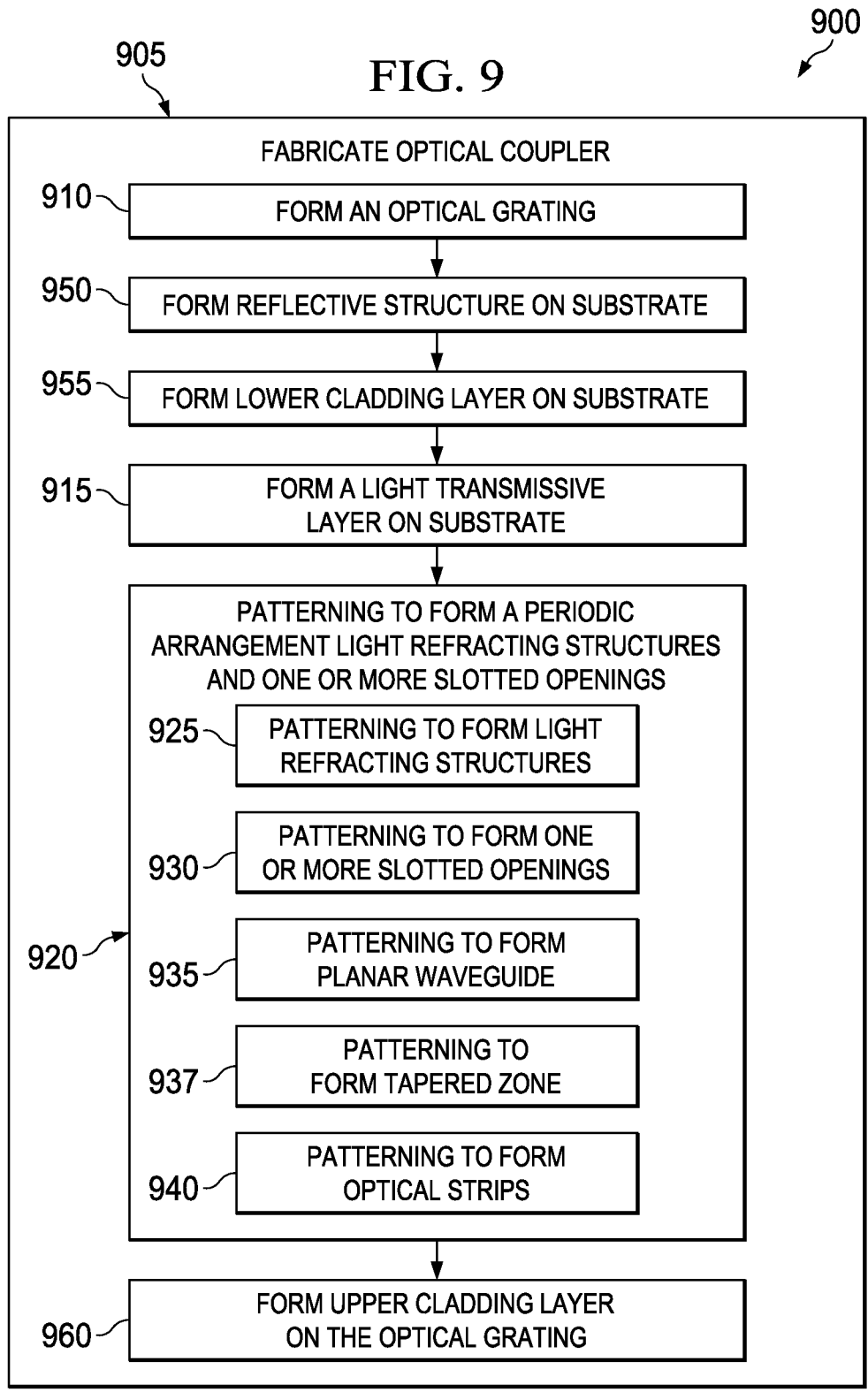

POLARIZATION-INDEPENDENT GRATING OPTICAL COUPLER

CROSS-REFERENCE TO RELATED APPLICATIONS

The present application is related to concurrently filed U.S. patent application Ser. No. 13/041,366 by Christopher Doerr, entitled, "RADIAL OPTICAL COUPLER"; concurrently filed U.S. patent application Ser. No. 13/077,149 by Christopher Doerr and Peter Winzer, entitled, "OPTICAL FIBERS WITH TUBULAR OPTICAL CORES", which are both incorporated herein by reference in their entirety.

TECHNICAL FIELD OF THE INVENTION

The present invention is directed to, in general, optical devices and more specifically, optical couplers of optical devices, and methods using and of manufacturing the devices.

BACKGROUND OF THE INVENTION

This section introduces aspects that may help facilitate a better understanding of the disclosure. Accordingly, these statements are to be read in this light and are not to be understood as admissions about what is prior art or what is not prior art.

Grating couplers are useful for coupling optical devices such as photonic integrated circuits (PICs) to the end of an optical fiber.

SUMMARY OF THE INVENTION

One embodiment of the present disclosure includes an optical device. The optical device comprises a planar waveguide located on a planar substrate, the planar waveguide including a light-transmissive layer and an optical grating coupler being located along the planar substrate and being adjacent to and optically coupled to the planar waveguide. The optical coupler includes an optical grating of the light-transmissive layer. The optical grating includes a periodic arrangement of light-refractive structures and one or more slotted openings separating the optical grating into two or more grating segments that have long axes that are substantially parallel to a propagation direction of a light beam configured to pass between the planar waveguide and the optical coupler. Pitch distances between adjacent ones of the grating segments are less than a wavelength of the light beam divided by an effective refractive index of the light-transmissive layer.

Another embodiment is a method of using an optical device that comprises transmitting a light beam through an optical coupler. Transmitting the light beam includes directing the light beam through the above-described optical grating in a light-transmissive layer, the transverse electric and transverse magnetic modes of the light beam being directed at a substantially same angle that is substantially normal to a planar substrate that the light-transmissive layer is located on.

Still another embodiment is a method of manufacturing an optical device which comprises fabricating an optical coupler on a planar substrate. Fabricating the optical coupler includes forming an optical grating, including forming a light-transmissive layer on the planar substrate and patterning the light-transmissive layer to form a periodic arrangement of light-refractive structures and to form one or more slotted openings separating the optical grating into two or more grating segments. The grating segments have long axes that are substantially parallel to a propagation direction of the light beam configured to pass between the optical coupler and a planar waveguide located on the planar substrate. Pitch distances between adjacent ones of the grating segments are less than a wavelength of the light beam divided by an effective refractive index of the light-transmissive layer.

BRIEF DESCRIPTION OF THE DRAWINGS

The various embodiments can be understood from the following detailed description, when read with the accompanying figures. Various features may not be drawn to scale and may be arbitrarily increased or reduced in size for clarity of discussion. Reference is now made to the following descriptions taken in conjunction with the accompanying drawings, in which:

FIG. 3 shows a cross-sectional view of the optical device including an optical coupler shown in FIG. 1, corresponding to view line 3-3 in FIG. 1;

FIG. 4 shows a cross-sectional view of the optical device including an optical coupler shown in FIG. 1, corresponding to view line 4-4 in FIG. 1;

FIG. 6 shows a plan view of another example embodiment of an optical device including an optical coupler of the disclosure;

FIG. 7 shows a plan view of another example embodiment of an optical device including an optical coupler of the disclosure;

FIG. 8 shows a flow diagram of an example embodiment of a method of using an optical device in accordance with the disclosure, for example, using any of the optical devices including optical couplers discussed in the context of FIGS. 1-5;

FIG. 9 shows a flow diagram of an example embodiment of a method of manufacturing an optical device in accordance with the disclosure, for example, using any of the optical devices including optical couplers discussed in the context of FIGS. 1-6.

DETAILED DESCRIPTION

This section introduces aspects that may help facilitate a better understanding of the illustrative embodiments. Accordingly, the statements of this section are to be read in this light and are not to be understood as admissions about what is prior art or what is not prior art.

For the purposes of the present disclosure, the term, "or," as used herein, refers to a non-exclusive or, unless otherwise indicated.

Many optical grating couplers, having a high refractive index contrast between a light-transmissive layer (e.g., a core layer) and surrounding cladding layer, are polarization dependent. That is, the transverse electric (TE) mode and transverse magnetic (TM) mode sometimes called quasi-TE and quasi-TM modes) of a light beam often have very different effective refractive indexes in such a grating. Because the effective refractive indexes of the TE and TM components of the light are different, the emission angles and field magnitudes of an electromagnetic field emitted from (or captured field by) such an optical grating coupler to the optical fiber are typically very different for TE versus TM modes. This, in turn, can cause inefficiencies in the transfer of light between grating couplers and optical fibers.

Various embodiments benefit from the recognition by the inventors that introducing a sequence of slotted openings into an optical grating coupler can help to equalize the effective refractive indexes of the optical grating coupler with respect to TE and TM modes of a light beam. For a non-slotted optical grating, the TM mode typically has a lower effective refractive index than the TE mode because more of the electric field of the TM mode typically pushes out from the top and bottom of the waveguide, i.e., into low-index material (e.g., the cladding), which is typically located above the light transmissive layer. By introducing slots into an optical grating, the effective refractive index of the TM is hardly changed, while the effective refractive index of the TE mode decreases as its field pushes out from the sides of the waveguide into the slots. The slots equalize the effective refractive indexes of the TE and TM modes of light. Equalizing these two effective refractive indexes causes the TE and TM modes of light to emit from the optical gratings at about the same angle (e.g., within about 5 degrees). This, in turn, improves the efficient transfer of light between an end of an optical fiber and such an optical grating, which is facing the end of the optical fiber. Furthermore, by having corrugation (the grating) in both the slot and the non-slot, one can equalize the magnitude of the coupling efficiency for both TE and TM modes, as well.

Figure 1:
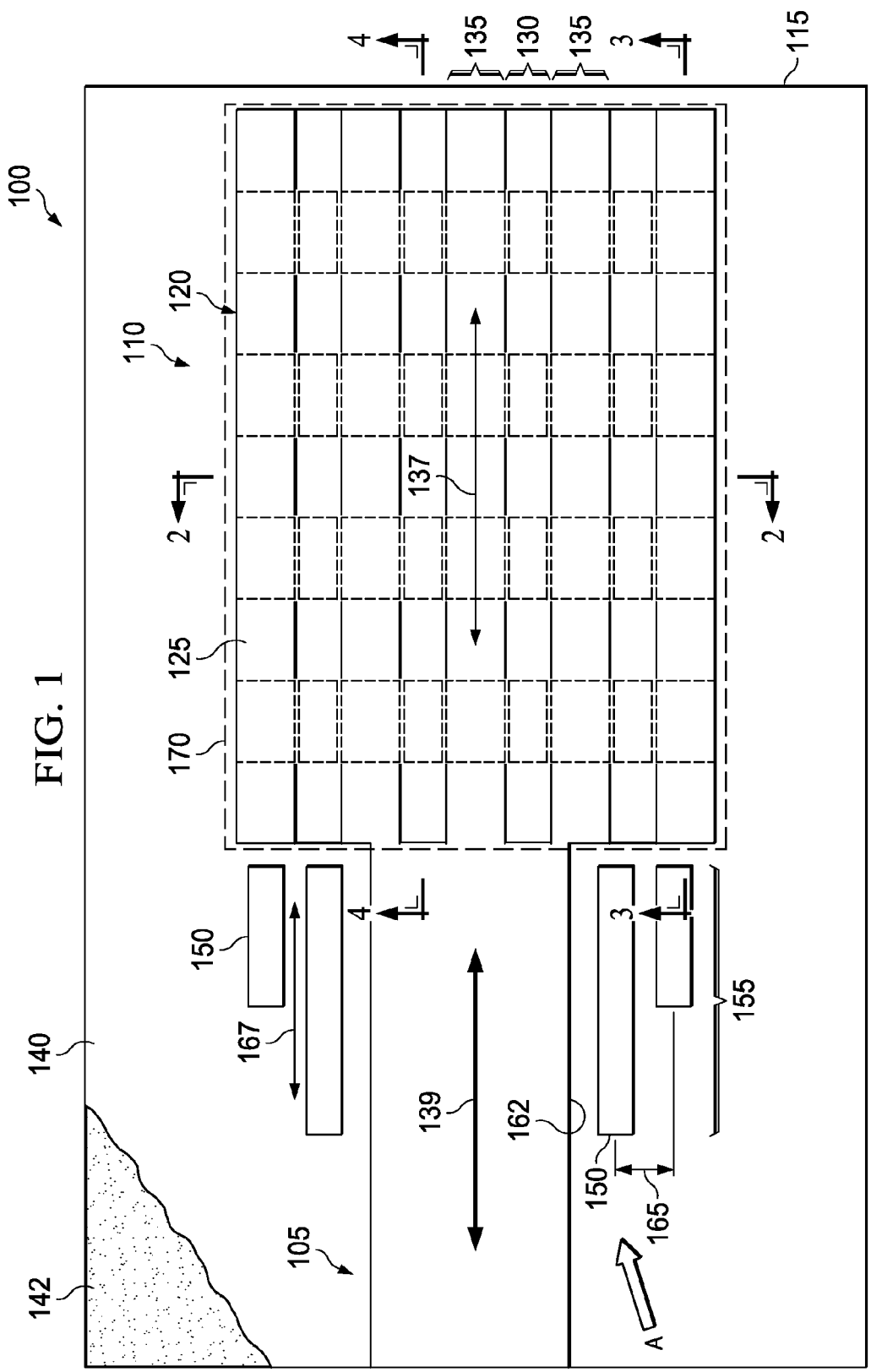
FIG. 1 shows a plan view of an example embodiment of an optical device including an optical coupler of the disclosure.
Figure 1A:
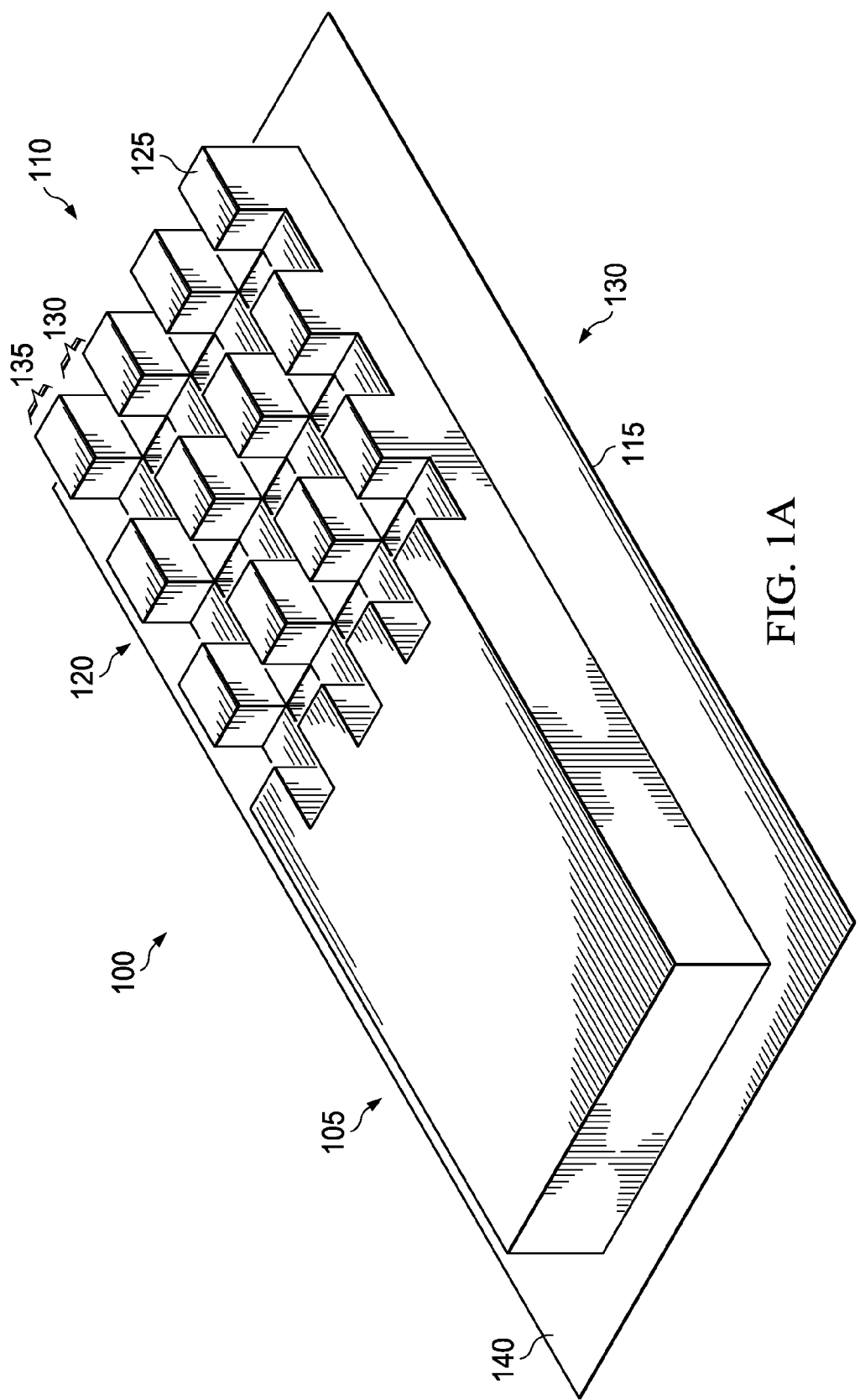
FIG. 1A shows a detailed perspective view of another example embodiment similar to the embodiment shown in FIG. 1, along view line A in FIG. 1.
Figure 2:
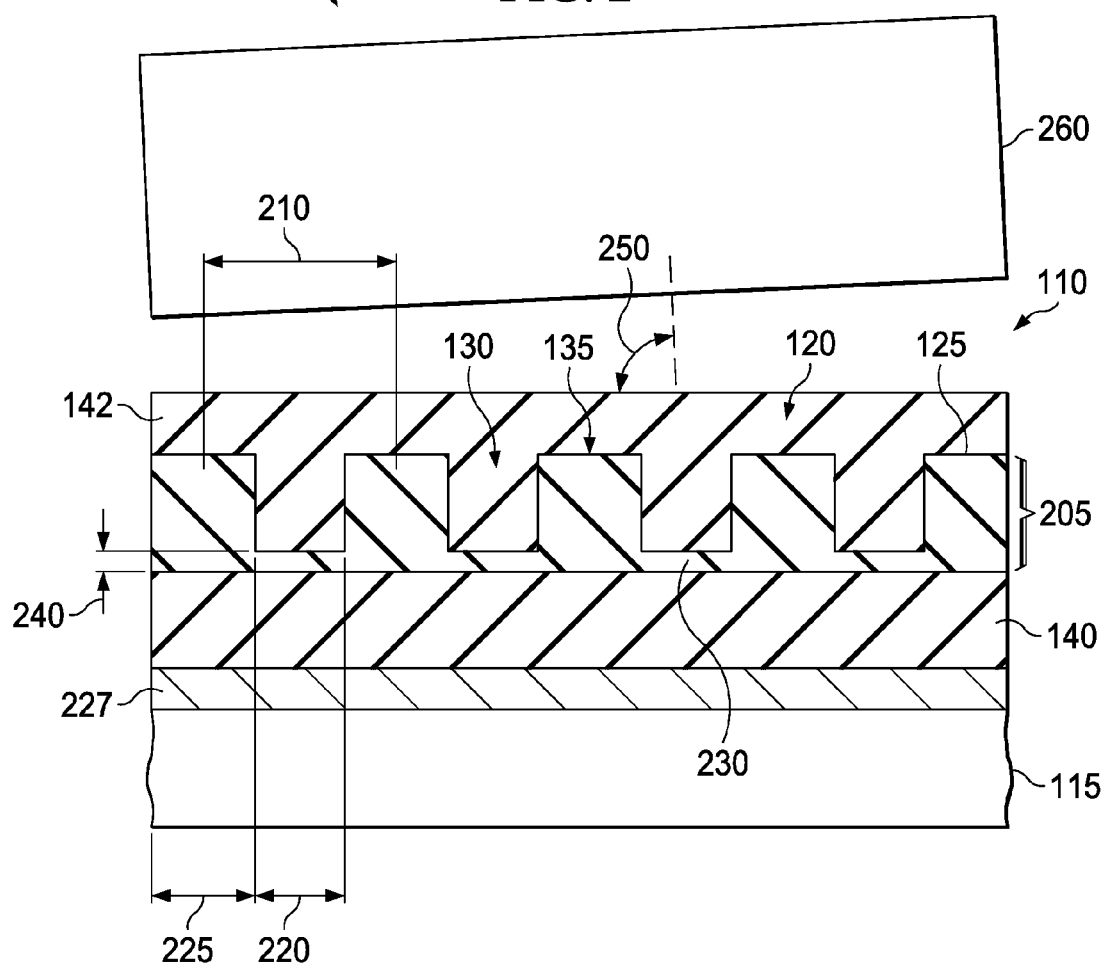
FIG. 2 shows a cross-sectional view of the optical device including an optical coupler shown in FIG. 1, corresponding to view line 2-2 in FIG. 1.

One embodiment is an optical device. In some embodiments, the optical device can be an electronic-photonic device such as a photonic integrated circuit (PIC). FIG. 1 shows a plan view of an example embodiment of an optical device 100. FIG. 1A shows a detailed perspective view of another example embodiment similar to the embodiment shown in FIG. 1, along view line A in FIG. 1. FIG. 2 shows a cross-sectional view of the device shown in FIG. 1, corresponding to view line 2-2 in FIG. 1. FIG. 3 shows a cross-sectional view of the device shown in FIG. 1, corresponding to view line 3-3 in FIG. 1. FIG. 4 shows a cross-sectional view of the device shown in FIG. 1, corresponding to view line 4-4 in FIG. 1.

With continuing reference to FIGS. 1-4, the optical device 100 comprises an optical planar waveguide 105 and an optical coupler 110, both located on a planar substrate 115. The optical grating coupler 110 is located along the planar substrate 115 is adjacent to and optically coupled to the waveguide 105.

The planar waveguide 105 includes a light-transmissive layer 205. The optical coupler 110 includes an optical grating 120 of the light-transmissive layer 205. The optical grating 120 includes a regular or periodic arrangement of light-refractive structures 125. The structures 125 for a pattern with a regular form, and the pattern may or may not be spatially chirped along one direction. One or more slotted openings 130 separate the optical grating 120 into two or more grating segments 135 that have long axes 137 that are substantially parallel (e.g., within about 10 degrees) to propagation direction 139 of a light beam configured to pass between the planar waveguide 105 and the optical coupler 110. Pitch distances 210 between adjacent ones of the grating segments are less than a wavelength of the light beam divided by the effective refractive index of the light-transmissive layer 205.

In some cases, pitch distances 210 between adjacent ones of the grating segments are less than a ratio. The ratio is the wavelength of the light-to-be-diffracted divided by the effective refractive index of the light-transmissive layer 205, e.g., the pitch distances 210 may be 3, 3, 4, 5, or more times smaller than the ratio. For example, the wavelength may be in the optical telecommunication C-band or L-band.

The term pitch distance 210 as used herein refers to the center-to-center distance of adjacent ones of the grating segments 135. It is important that the slotted openings 130 that separate the grating segments 135 create a sub-wavelength segmented optical grating 120 that will not interfere with the transmission of light between the planar waveguide 105 and the optical coupler 110. Configuring the pitch distance 210 to be less than a wavelength of the light beam divided by the refractive index of the light-transmissive layer 205 prevents the two or more grating segments 135 from themselves acting as an optical grating and, thereby avoids undesired reflections or diffractions of the light beam. For example, in some embodiments when the wavelength of the light beam light beam is configured to pass between the planar waveguide 105 and the optical coupler 110 equals about 1.5 microns, and the light-transmissive layer 205 is composed of silicon (refractive index 3.5) the maximum pitch distance 210 equals about 0.4 microns.

To facilitate having a sub-wavelength segmented optical grating 120, in some embodiments, widths 220 of the slotted openings 130 are substantially equal to (e.g., within about 25 percent) about one-half of a width 225 of the grating segments 135. Continuing with the same example, in embodiments where the pitch 210 equals about 0.4 microns, the grating segments 135 can have a width 225 of about 0.25 microns and the slotted openings 130 can have a width 220 equal to about 0.15 microns. In some cases, configuring the slotted opening's width 220 in this manner facilitates operating the device 100 with a duty cycle (i.e., the percentage of the period occupied by the slot) of about 50 percent or more.

In some embodiments the light beam is a single mode light beam. In some embodiments the device 100 is configured to transmit a C-band or L-band wavelengths of the light beam, as commonly used in the telecommunications industry, and the pitch 210 is less than the C-band or L-band wavelength.

In some embodiments, the optical coupler 110 is not coupled to any other planar waveguide that is substantially transverse to the planar waveguide 105 (e.g., transverse to direction 139).

In some embodiments, the grating segments 135 are patterned with the light-refractive structures 125, in a direction transverse to the slotted openings 130, by a regular pattern.

In some embodiments, the light-transmissive layer 205 includes a sequence of substantially parallel grating segments 135, each adjacent pair of the grating segments being separated by a slotted opening 130 there between. In some embodiments, the pitch distances 210 between adjacent ones of the grating segments 120 is less than a ratio equal to a wavelength in the telecommunication L-band (or C-band), divided by the effective refractive index of the light-transmissive layer 205.

In some embodiments of the device 100, the light-transmissive layer 205 is composed of silicon, although other inorganic or organic core materials, typically used in photonic device can be used, to guide the light through the planar waveguide 105 and the optical coupler 110. For instance, the light-transmissive layer 205 can comprise a silicon layer of a silicon-on-insulator substrate 115.

The device 100 can further include a lower cladding layer 140 and upper cladding layer 142 (e.g., silicon oxide layers) to facilitate light guiding. Some embodiments of the device 100 can further include a reflecting layer 227 to improve the efficiency of light transmission through the optical grating 120, by reflecting light transmitted through the grating 120 that would otherwise be lost due to light scattering into the substrate 110, back into the grating 115. In some cases, reflective layer 227 can include metal layer, such as a gold or silver layer. In other cases, the reflective layer 227 can include a distributed brag reflector (e.g., a planar distributed brag reflector).

In some embodiments, such as shown in FIG. 1, the light-refractive structures 125 are aligned with each other (e.g., in columns or rows in some case) the optical grating 120. Embodiments of the light-refractive structures 125 of the optical grating 120 can have similar dimensions and pitch distance as conventional optical gratings.

However, in some cases, the presence of a plurality of the slotted openings 130 can substantially reduce the effective refractive index of the optical grating 120, compared to an analogously configured non-slotted optical grating. In some cases, as shown in FIG. 3, to compensate for a decreased effective refractive index, it can be advantageous to increase the height 310 of the light-refractive structures 125. For example in some cases, the light-refractive structures 125 have a height 310 that is greater than half the thickness 315 of the light transmissive layer 205. For example, if the light transmissive layer 205 has a thickness 315 of about 0.3 microns then the height 310 of the light-refractive structure can equal about 0.15 microns or greater. In some embodiments, the light-refractive structures 125 have a uniform height 310 while in other cases the height 310 can be different between different the light-refractive structures 125.

As illustrated in FIG. 2 adjacent pairs of the two or more grating segments 130 can be physically connected to each other by connecting portions 230 of the light-transmissive layer 205 in the optical grating 120. In other embodiments, however, the two or more grating segments 135 are physically isolated portions of the layer (e.g., segments 135 are physically isolated from each other). That is, there are no connecting portions 230.

In some embodiments, for ease of manufacture, the pitch distances 210 are substantially equal to each other (e.g., within 10 percent). However, in other cases, there could be different pitch distances 210 between adjacent pairs of grating segments 135.

In some embodiments, to facilitate the device's 100 manufacture, the connecting portions 230, located along the slotted openings 130, are all a same height 240. In other cases, as shown in FIG. 4, the connecting portions 230 can have different heights 240 (including some or all having a zero height) along the slotted opening 130. Having different heights 240 can, e.g., facilitate equalize the grating's 120 strength for both TE and TM polarization.

As further illustrated in FIG. 1, in some embodiments the device 100 further includes one or more isolated optical strips 150 of the light-transmissive layer 205 to transition in a low-loss manner from a conventional waveguide to the optical coupler 110. The optical strips 150 are configured to reduce the optical mode mismatch between the planar waveguide 105 and the optical grating 120 segments 135 and thereby reduce reflective losses when light transitions between the planar waveguide 105 and the optical coupler 110.

The isolated optical strips 150 are separated from and adjacent to a portion 155 of the planar waveguide 105 that is next to the optical grating 110. To prevent the optical strips 150 from acting as an optical grating and, thereby avoid undesired reflections or diffractions, a separation distance 160 between an outside edge 162 of planar waveguide portion 155 and center of the strips 150 nearest to the planar waveguide portion 155 is less than a wavelength of the light beam divided by the refractive index of the light-transmissive layer 205. For the same reason, a pitch distance 165 between adjacent optical strips 150 is less than a wavelength of the light beam divided by the refractive index of the light-transmissive 205. In some cases, for ease of manufacture, the pitch distance 165 between the optical strips 150 is substantially the same (e.g., within 10 percent) as the pitch distance 210 between adjacent ones of the grating segments 130.

As illustrated in FIG. 1, some embodiments of the optical strips 150 can be shaped as rectangular prisms, and each optical strips 150 can have a long axis 167 that is substantially parallel (e.g., within about 10 degrees) to the propagation direction 139 of the light beam configured to pass between the planar waveguide 105 and the optical coupler 110. As also illustrated there can be longer optical strips 150 on either side of the planar waveguide portion 155 and then shorter optical strips 150 added as the planar waveguide 110 approaches the optical coupler 110.

Figure 5:
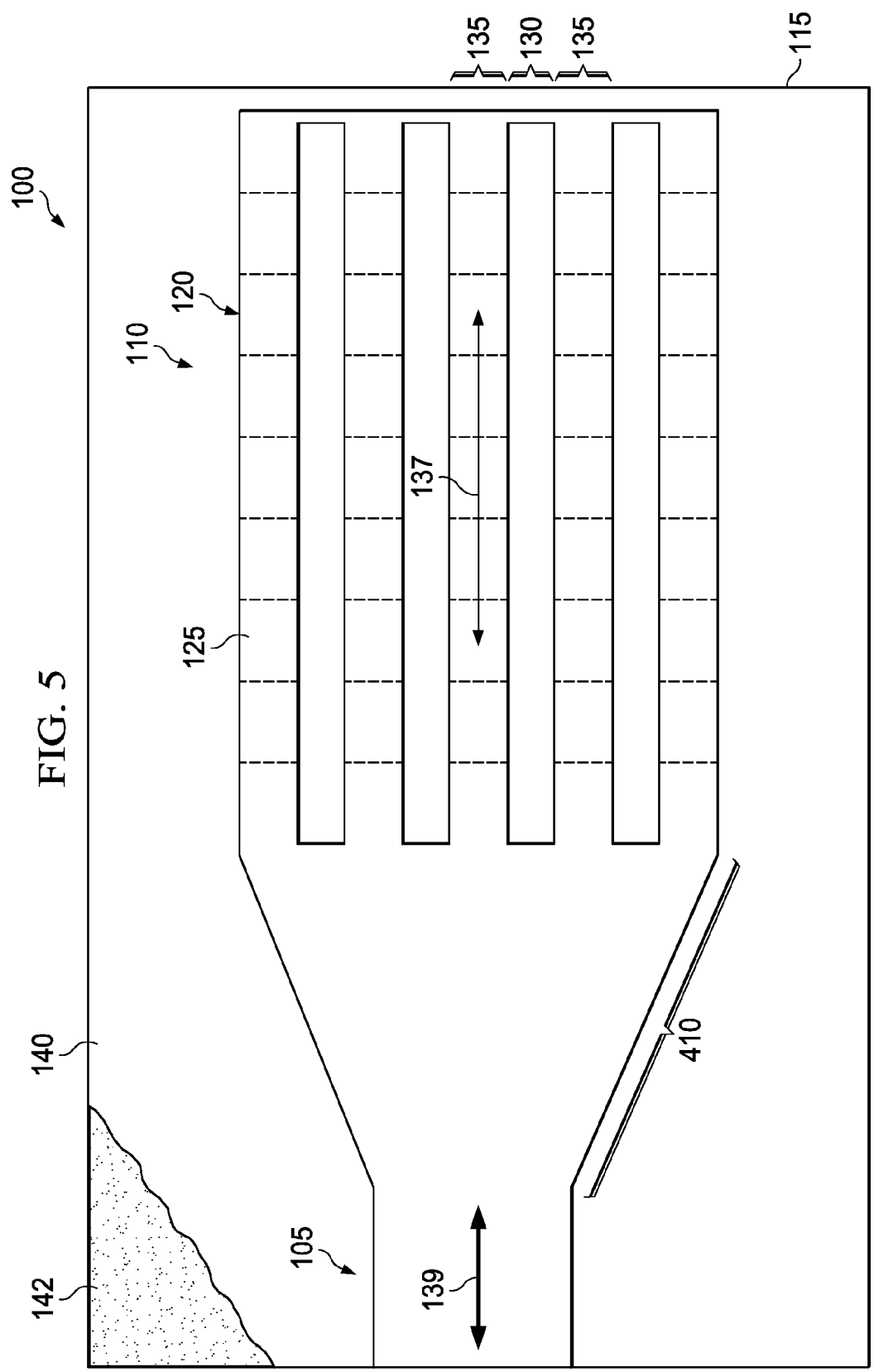
FIG. 5 shows a plan view of another example embodiment of an optical device including an optical coupler of the disclosure.

FIGS. 5-7 show plan views of alternative example embodiments of an optical modulator embodiment of the device 100. The same indicators are used to reference analogous structures as depicted in FIG. 1-4.

In some embodiments of the device 100, such as shown in FIG. 5, it is advantageous to have a tapering zone 410 of the light-transmissive layer 205 located between the planar waveguide 105 and the optical grating 110. The tapering zone 410 is configured to interchange a mode size of the light between a mode size in the planar waveguide 105 and a mode size in the optical grating 110. For example as depicted in FIG. 5, in some embodiments a wide end 415 of the tapered zone 410 is optically coupled to the optical grating 110 and a narrow end 420 of the tapered zone 410 is optically coupled to the planar waveguide 105.

In other cases, such as depicted in FIG. 6, wide end 415 of the tapered zone 410 is optically coupled to the planar waveguide 105 and the narrow end 420 is optically coupled to the optical grating 110. For example, the narrow end 420 can be continuous with one of the optical segments 135 of the optical grating 110. That is, the planar waveguide 105 can taper down in the tapering zone 410 such that the portion of the light transmissive layer 205 that formed the planar waveguide 105 is continuous with the tapered zone 410 and one of the optical segments 135 of the optical coupler 110.

It can be advantageous in some embodiments to include optical strips 150 of the light-transmissive layer 205 that are adjacent to the tapered zone 410 to facilitate mode-matching between the planar waveguide 105 and the optical coupler 110. For instance, as shown in FIG. 6, in some cases, one or more optical strips 150 can be located parallel to the outer edge 510 of the tapered zone 410. The one or more optical strips nearest to the tapered zone are separated from the tapered zone 410 by extended portions 610 of individual ones of the one or more slotted openings 130. And, the one or more optical strips 150 are separated from each other by extended portions 610 of different individual ones of one or more slotted openings 130.

As further illustrated in FIG. 6, each of the one or more optical strips 150 can be optically coupled to individual ones of the grating segments 135. For instance, the optical strips 150 and individual ones of the grating segments 135 can be continuous pieces of the light-transmissive layer 205. Analogous to that described for the optical strip configuration depicted in FIG. 1, the can be longer optical strips strip on either side nearest to tapered zone 410 and then shorter optical strips 150 added as the tapered zone 410 approaches the optical coupler 110.

Based upon the present disclosure one of ordinary skill in the art would understand that other configurations could be used to facilitate mode matching between the planar waveguide 105 and the optical coupler 110. For instance, still other embodiments of the device 100 can include a lens or a focusing grating coupler such as described in Mekis et al, GRATING-COUPLER-ENABLED CMOS PHOTONICS PLATFORM, IEEE JOURNAL OF SELECTED TOPICS IN QUANTUM ELECTRONICS, incorporated by reference in its entirety.

In some embodiments of the device 100, such as shown in FIG. 7, there can be one of a plurality of optical couplers 110 that are part of a circular optical coupler 710. In some embodiments a plurality of the planar waveguides 105 are radially distributed around the circular optical coupler 710, each one of the planar waveguides 105 are optically coupled to an individual one of a plurality of the optical couplers 110 and the plurality of optical couplers 110 are arranged in a circular formation. The optical couplers 110 can be configured as in any of the embodiments discussed herein. For instance, the optical coupler 110 includes the optical grating 120, and can include one or both of the optical strips 150 and the tapering zone 410, such as discussed in the context of FIGS. 1-6.

In some cases it is desirable to space the optical couplers 110 of the circular optical coupler 710 far enough apart that the optical couplers do not form a grating structure that could undesirably reflect or diffract light. For instance, in some embodiments adjacent optical couplers are separated by a distance 720 that is at least about three times a wavelength of the light beam. For example, when the wavelength of the light is 1.5 microns the separation distance 720 is at least about 4.5 microns. In other cases, however, adjacent optical couplers 110 can be gradually converged towards the center of the circular optical coupler 710 thereby permitting optical interaction with minimum unwanted reflections or diffractions.

As further illustrated in FIG. 2, some embodiments of the optical grating 120 are configured to receive or transmit the light beam at an angle 250 that is substantially normal to the planar substrate 115 (e.g., from 84 to 89 degrees, in some cases). For instance, the optical grating 120 can be configured to pass the light beam to or from an optical fiber 260 whose end is locatable above and facing the optical coupler 110. Based upon the present disclosure, one skilled in the art would understand how to adjust the slotted openings 130 in the optical grating 120 such that the TM and TE modes of light beam are emitted to (or received from the fiber) at the angle 260 that is within an acceptance angle of the optical fiber 250. In some embodiments of the optical coupler 110 an outer perimeter 170 (FIG. 1) of the optical grating 120 has an area that is equal to or greater than cross-sectional area of a mode size of the optical fiber 260 optically couplable to the optical grating 120.

Another embodiment of the disclosure is a method of using an optical device. With continuing reference to FIGS. 1-7, FIG. 8 presents a flow diagram of an example method 800 of using the optical device 100, such as any of the optical devices 100 discussed in the context of FIGS. 1-7.

The method 800 includes a step 810 of transmitting a light beam through an optical coupler 110. Transmitting the light beam (step 810) further includes a step 820 of directing the light beam through an optical grating 120 in a light-transmissive layer 205, the transverse electric (TE) and transverse magnetic (TM) modes of the light beam being directed at a substantially same angle 250 that is substantially normal to a planar substrate 115 that the light-transmissive layer is located on.

The optical grating 110 includes a periodic arrangement of light-refractive structures 125 and one or more slotted openings 130 separating the optical grating 120 into two or more grating segments 135 that have long axes 137 that are substantially parallel to a propagation direction 139 of the light beam configured to pass between the optical coupler 110 and a planar waveguide 105 located on the planar substrate 115. Pitch distances 210 between adjacent ones of the grating segments 135 are less than a wavelength of the light beam divided by the refractive index of the light-transmissive layer 205.

In some embodiments, in step 820 the propagation direction 139 of the light beam is reversed. For example the light beam can enter the optical grating 120 from the planar waveguide 105 exits the optical grating 120 at the substantially normal angle 250. For example the light beam can enter the optical grating 120 at the substantially normal angle 250, e.g., from the adjacent end of an optical fiber, and exit the optical grating to the planar waveguide 105.

In some embodiments, the method 800 can further include a step 830 of reflecting a portion of the diffracted light (e.g., the light directed in step 810) that is scattered below the optical grating 120 using an optional reflective layer 227 located on the planar substrate 110 and below optical grating 120.

Another embodiment is a method of manufacturing the optical device. FIG. 9 presents a flow diagram showing selected steps of an example method 900 of manufacture an optical device such as any of the optical devices 100 discussed in the context of FIGS. 1-8.

With continuing reference to FIGS. 1-7, the method 900 includes a step 905 of fabricating an optical coupler 110 on a planar substrate 115. Fabricating the optical coupler 110 (step 905) includes a step 910 of forming an optical grating 120. Forming the optical grating (step 910) including a step 915 of forming a light-transmissive layer 205 on the planar substrate 105. In some cases, forming the light-transmissive layer 205 in step 910 can include growing or depositing an epitaxial layer of silicon the planar substrate 115. One of ordinary skill would be other methods to form light transmissive layers 205 in accordance with step 910.

Forming the optical grating (step 910) also includes a step 920 of patterning the light-transmissive layer 205 to form a periodic, or a spatially chirped periodic, arrangement of light-refractive structures 125 and to form one or more slotted openings 130 separating the optical grating 120 into two or more grating segments 135. As discussed above in the context of FIGS. 1-2, the grating segments 135 have long axes 137 that are substantially parallel to a propagation direction 139 of a light beam configured to pass between the optical coupler 110 and a planar waveguide 105 located on the planar substrate 115. Pitch distances 210 between adjacent ones of the grating segments 130 are less than a wavelength of the light beam divided by the refractive index of the light-transmissive layer 205.

One of ordinary skill would be familiar with photolithographic methods and etching processes to pattern the light transmissive layer in accordance with step 920.

In some cases patterning (step 920) the light-transmissive layer to form the periodic, or a spatially chirped periodic, arrangement of light-refractive structures and to form the one or more slotted openings are performed as two separate steps 925, 930 (e.g., each step having one or both of separate photolithographic masking and etching processes).

Similarly, in some embodiments, the patterning step 920 further includes one or both of patterning the light-transmissive layer 205 to form the planar waveguide 105, the form optical strips 150 and the tapering zone 410. In other cases, however, separate patterning steps 935, 937, 940 can be performed to form the planar waveguide 105, tapering zone 410 and the optical strips 150, respectively.

Embodiments of the method 900 can further include a step 950 of forming a reflective layer 227 on the planar substrate (e.g., physical or chemical vapor depositing a silver or gold layer), a step 955 of forming a lower cladding layer 140 on the planar substrate 115 and a step 960 of forming an upper cladding layer 142 on the optical grating 120 (and other patterned structures of the light transmissive layer 205 such as the planar waveguide 105, optical strips 150 and tapering zone 410). For example thermally grown layers of silicon oxide can formed as part of steps 955 and 960.

Although the embodiments have been described in detail, those of ordinary skill in the art should understand that they could make various changes, substitutions and alterations herein without departing from the scope of the disclosure.

What is claimed is:

1. An optical device, comprising:
  a planar waveguide located on a planar substrate, the planar waveguide including a light-transmissive layer; and
  an optical grating coupler being located along the planar substrate and being adjacent to and optically coupled to the planar waveguide, the optical coupler including an optical grating of the light-transmissive layer, wherein:
  one or more slotted openings separating the optical grating into two or more grating segments that have long axes that are substantially parallel to a propagation direction of a light beam configured to pass between the planar waveguide and the optical coupler, and pitch distances between adjacent ones of the grating segments are less than a wavelength of the light beam divided by an effective refractive index of the light-transmissive layer, and
  wherein the wavelength of the light beam is in the C or L telecommunication band.

2. The device of claim 1, wherein the light-refractive structures have a height that is greater than half the thickness of the light transmissive layer.

3. The device of claim 1, wherein the pitch distances are substantially equal to each other.

4. The device of claim 1, wherein adjacent pairs of the two or more grating segments are physically connected to each other by connecting portions of the light-transmissive layer in the optical grating.

5. The device of claim 1, wherein the two or more grating segments are physically isolated portions of the layer.

6. The device of claim 1, further including one or more isolated optical strips of the light-transmissive layer separated from and adjacent to a portion of the planar waveguide that is next to the optical grating.

7. The device of claim 6, wherein a pitch distance between adjacent one of the optical strips is less than a wavelength of the light beam divided by the refractive index of the light-transmissive layer.

8. The device of claim 1, further including a tapered zone of the light-transmissive layer located between the planar waveguide and the optical grating, wherein the tapered zone is configured to interchange a mode size of the light between a mode size in the planar waveguide and a mode size in the optical grating.

9. The device of claim 8, wherein the planar waveguide is continuous with the tapering zone and one of the grating segments.

10. The device of claim 8, further including one or more optical strips of the light-transmissive layer located parallel to the tapered zone, wherein: the one or more optical strips nearest to the tapered zone are separated from the tapered zone by extended portions of individual ones of the one or more slotted openings; the one or more optical strips are separated from each other by extended portions of different individual ones of one or more slotted openings; and each of the one or more optical strips are optically coupled to individual ones of the grating segments.

11. The device of claim 1, wherein the optical coupler is one of plurality of optical couplers in a circular optical coupler.

12. The device of claim 11, wherein an outer perimeter of the optical grating has an area that is equal to or greater than a cross-sectional area of a mode size of an optical fiber optically couplable to the optical grating.

13. The device of claim 1, wherein the optical grating is configured to receive or transmit the light beam at an angle that is substantially normal to the planar substrate.

14. The device of claim 1, wherein the optical fiber optical grating is configured to pass the light to or from an optical fiber located above the optical coupler.

15. The device of claim 1, wherein the wavelength of the light beam is in the C or L telecommunication band.

16. A method of using an optical device, comprising:
  transmitting a light beam through an optical coupler, including:
    directing the light beam through an optical grating in a light-transmissive layer, the transverse electric and transverse magnetic modes of the light beam being directed at a substantially same angle that is substantially normal to a planar substrate that the light-transmissive layer is located on, wherein the optical grating includes:
  a periodic arrangement of light-refractive structures, one or more slotted openings separating the optical grating into two or more grating segments that that have long axes that are substantially parallel to a propagation direction of the light beam configured to pass between the optical coupler and a planar waveguide located on the planar substrate, and pitch distances between adjacent ones of the grating segments are less than a wavelength of the light beam divided by an effective refractive index of the light-transmissive layer, and
  wherein the wavelength of the light beam is in the C or L telecommunication band.

17. The method of claim 16, wherein the transmission direction of the light beam through the optical coupler is reversed.

18. The method of claim 16, wherein the wavelength of the light beam is in the C or L telecommunication band.

19. A method of manufacturing an optical device, comprising:
  fabricating an optical coupler on a planar substrate, including:
    forming an optical grating, including: forming a light-transmissive layer on the planar substrate; and
    patterning the light-transmissive layer to form a periodic arrangement of light-refractive structures and to form one or more slotted openings separating the optical grating into two or more grating segments having long axes that are substantially parallel to a propagation direction of the light beam configured to pass between the optical coupler and a planar waveguide located on the planar substrate, wherein pitch distances between adjacent ones of the grating segments are less than a wavelength of the light beam divided by an effective refractive index of the light-transmissive layer, and wherein the wavelength of the light beam is in the C or L telecommunication band.

20. The method of claim 19, wherein patterning the light-transmissive layer to form the periodic arrangement of light-refractive structures, and to form the one or more slotted openings, are performed in two separate steps.

21. The method of claim 19, wherein patterning further includes patterning the light-transmissive layer to form the planar waveguide.

22. The method of claim 19, wherein the patterning further includes patterning the light-transmissive layer to form one or more optical strips of the light-transmissive layer.

\* \* \* \* \*